(12) United States Patent
Tang (10) Patent No.: US 10,952,164 B2
(45) Date of Patent: Mar. 16, 2021

(54) INFORMATION TRANSMISSION METHOD AND DEVICE

(71) Applicant: Guangdong OPPO Mobile Telecommunications Corp., Ltd., Guangdong (CN)

(72) Inventor: Hai Tang, Dongguan (CN)

(73) Assignee: Guangdong OPPO Mobile Telecommunications Corp., Ltd., Dongguan (CN)

( * ) Notice: Subject to any disclaimer, the term of this patent is extended or adjusted under 35 U.S.C. 154(b) by 0 days.

(21) Appl. No.: 16/860,981

(22) Filed: Apr. 28, 2020

(65) Prior Publication Data
US 2020/0260392 A1    Aug. 13, 2020

Related U.S. Application Data

(63) Continuation of application No. PCT/CN2017/108916, filed on Nov. 1, 2017.

(51) Int. Cl.
*H04W 56/00* (2009.01)
*H04W 72/04* (2009.01)

(52) U.S. Cl.
CPC ....... *H04W 56/00* (2013.01); *H04W 72/0406* (2013.01)

(58) Field of Classification Search
CPC combination set(s) only.
See application file for complete search history.

(56) References Cited

U.S. PATENT DOCUMENTS

| 2018/0263064 | A1* | 9/2018 | Islam | H04W 72/1205 |
| 2018/0302182 | A1* | 10/2018 | Ly | H04L 27/2613 |
| 2018/0337755 | A1* | 11/2018 | John Wilson | H04W 56/0015 |
| 2019/0082333 | A1* | 3/2019 | Malik | H04W 24/10 |
| 2019/0089474 | A1* | 3/2019 | Ly | H04L 27/2602 |
| 2019/0140880 | A1* | 5/2019 | Li | H04L 5/00 |

(Continued)

FOREIGN PATENT DOCUMENTS

| CN | 107104721 A | 8/2017 |
| EP | 3691374 A1 | 8/2020 |
| WO | 2018213026 A1 | 11/2018 |

OTHER PUBLICATIONS

International Application No. PCT/CN2017/108916, International search report, dated Jul. 24, 2018, 2 pages.

(Continued)

*Primary Examiner* — Xavier S Wong
(74) *Attorney, Agent, or Firm* — Kilpatrick Townsend & Stockton LLP (57) ABSTRACT

Embodiments of this application disclose an information transmission method and device. The method includes receiving, by a terminal device, a first synchronization signal block sent by a network device, wherein the first synchronization signal block comprises a first physical broadcast channel (PBCH), and information carried on the first PBCH comprises first information and second information. The first information is used for indicating whether remaining minimum system information (RMSI) is present, and when the first information indicates that RMSI is not present, the second information is used for indicating resource information of a second synchronization signal block.

25 Claims, 7 Drawing Sheets

200

A terminal device receives a first synchronization signal block sent by a network device, where the first synchronization signal block includes a first physical broadcast channel PBCH, and information carried on the first PBCH includes first information and second information — S210

The terminal device obtains resource information of a second synchronization signal block from the second information if the first information indicates that no remaining minimum system information RMSI exists — S220

(56) References Cited

U.S. PATENT DOCUMENTS

2019/0387550 A1* 12/2019 Pan .................. H04L 5/0094
2020/0068512 A1* 2/2020 Xue .................. H04W 56/001

OTHER PUBLICATIONS

Ericsson, Remaining details on NR-PBCH design, 3GPP TSG RAN WG1 NR Ad-Hoc#3, Nagoya, Japan, R1-1716150, Sep. 18-21, 2017.

ZTE, Sanechips, Remaining details of Synchronization Signal Design, 3GPP TSG RAN WG1 Meeting #90bis, Prague, Czech Republic, R1-1717030, Oct. 9-13, 2017.

Motorola Mobility, Lenovo, Discussion on NR-PBCH contents, 3GPP TSG RAN WG1 #90, Prague, Czech Republic, R1-1714214, Aug. 21-25, 2017.

Russian Application No. 2020116961/20(028279), "First Office Action", dated Jun. 30, 2020, 6 pages.

OPPO, "Remaining details on SS block transmissions", 3GPP TSG RAN WG1 Meeting #90bis R1-1718058, Oct. 13, 2017, 4 pages, Prague, CZ.

Spreadtrum Communications, "Cell searching with multiple SS blocks in wideband CC", 3GPP TSG RAN WG1 Meeting 90bis R1-1717740, Oct. 13, 2017, 5 pages, Prague, CZ.

R1-1711374 Ericsson NR-PBCH Content and payload size Jun. 27-30, 2017.

R1-1713252 Guangdong OPPO Mobile Telecom Remaining details on multiple SS block transmissions in wideband CC Aug. 21-25, 2017.

R1-1705841 Nokia, Alcatel-Lucent Shanghai Bell on Remaining System Information Delivery Apr. 3-7, 2017.

R1-1704603 Guangdong OPPO Mobile Telecom Discussion on the remaining system information delivery Apr. 3-7, 2017.

The extended European search report for European application 17930796.2 dated Sep. 17, 2020.

* cited by examiner

| A terminal device receives a first synchronization signal block sent by a network device, where the first synchronization signal block includes a first physical broadcast channel PBCH, and information carried on the first PBCH includes first information and second information | S210 |

| The terminal device obtains resource information of a second synchronization signal block from the second information if the first information indicates that no remaining minimum system information RMSI exists | S220 |

INFORMATION TRANSMISSION METHOD AND DEVICE

CROSS-REFERENCES TO RELATED APPLICATIONS

This application is a continuation of and claims priority to International Patent Application No. PCT/CN2017/108916, filed on Nov. 1, 2017, the contents of which is hereby incorporated by reference in its entirety.

BACKGROUND OF THE INVENTION

Technical Field

Embodiments of this application relate to the communications field, and more specifically, to an information transmission method and device.

Related Art

In a 5G new radio (New Radio, NR) system, when a terminal device needs to access a network, the terminal device needs to obtain system information from the network. Specifically, some system information may be obtained through a physical broadcast channel (Physical Broadcast Channel, PBCH, or NR-PBCH), and remaining minimum system information (Remaining Minimum System Information, RMSI) may further be obtained through a physical downlink shared channel (Physical Downlink Shared Channel, PDSCH, or NR-PDSCH). Downlink control information (Downlink Control Information, DCI) corresponding to the NR-PDSCH is carried on a physical downlink control channel (Physical Downlink Control Channel, PDCCH, or NR-PDCCH). A time-frequency resource location of the NR-PDCCH is indicated based on (Control Resource Set, CORESET) information carried on the NR-PBCH. The NR-PBCH may further carry indication information for indicating whether a synchronization signal block (Synchronization Signal block, SS block) corresponding to the NR-PBCH is associated with the RMSI. If the indication information indicates that the SS block is not associated with the RMSI, the terminal device does not need to receive corresponding RMSI. However, the terminal device needs to blindly detect other SS blocks to obtain RMSI, increasing complexity of SS block detection by the terminal device.

SUMMARY OF THE INVENTION

Embodiments of this application provide an information transmission method and device, helping reduce complexity of SS block detection by a terminal device.

According to a first aspect, an information transmission method is provided, and includes receiving, by a terminal device, a first synchronization signal block sent by a network device, where the first synchronization signal block includes a first physical broadcast channel PBCH, and information carried on the first PBCH includes first information and second information; and obtaining, by the terminal device, resource information of a second synchronization signal block from the second information if the first information indicates that no remaining minimum system information RMSI exists.

Therefore, in the information transmission method in this embodiment of this application, the terminal device may obtain the resource information of the second synchronization signal block based on the second information carried on the first PBCH when the first information carried on the first PBCH indicates that no RMSI exists, and further may receive the second synchronization signal block according to the resource information of the second synchronization signal block, thereby reducing complexity of blindly detecting other synchronization signal blocks by the terminal device.

With reference to the first aspect, in some possible implementations of the first aspect, the method further includes: receiving, by the terminal device, the second synchronization signal block according to the resource information of the second synchronization signal block, where the second synchronization signal block includes a second physical broadcast channel PBCH, information carried on the second PBCH includes third information and fourth information, the third information indicates that RMSI exists, and the fourth information indicates a resource set carrying control information for receiving the RMSI.

With reference to the first aspect, in some possible implementations of the first aspect, the method further includes: in case that the third information indicates that RMSI exists, obtaining, by the terminal device, the RMSI according to the fourth information.

With reference to the first aspect, in some possible implementations of the first aspect, the obtaining, by the terminal device, the RMSI according to the fourth information includes detecting a physical downlink control channel PDCCH according to the resource set indicated by the fourth information, and obtaining scheduling information of a physical downlink shared channel PDSCH; and obtaining, according to the scheduling information of the PDSCH, RMSI carried on the PDSCH.

With reference to the first aspect, in some possible implementations of the first aspect, the resource information of the second synchronization signal block is frequency-domain resource position information of the second synchronization signal block or offset information of a frequency domain position of the second synchronization signal block relative to that of the first synchronization signal block.

With reference to the first aspect, in some possible implementations of the first aspect, a first bit field for carrying the second information and a second bit field for carrying the fourth information at least partially overlap.

That is, when indication information carried on a PBCH indicates that RMSI exists, a second bit field in the PBCH may be used to carry information about a resource set of control information for receiving the RMSI. When the indication information carried on the PBCH indicates that no RMSI exists, the fourth information actually makes no sense. Therefore, the fourth information may not need to be carried still based on the second bit field. Instead, a part or all of the second bit field may be used to carry the second information. In other words, in different scenarios, a specific bit field (namely, an overlapping part of the first bit field and the second bit field) in the PBCH may be reused to carry different information, thereby reducing signaling overheads.

With reference to the first aspect, in some possible implementations of the first aspect, the RMSI includes at least one of the following: a paging configuration parameter, cell selection information, and access control information.

According to a second aspect, an information transmission method is provided, and includes: determining, by a network device, that no remaining minimum system information RMSI exists; and sending, by the network device, a first synchronization signal block to a terminal device, where the first synchronization signal block includes a first physical broadcast channel PBCH, information carried on the first PBCH includes first information and second information, the first information is used to indicate that no RMSI exists, and the second information is used to indicate resource information of a second synchronization signal block.

With reference to the second aspect, in some possible implementations of the second aspect, the second synchronization signal block includes a second physical broadcast channel PBCH, information carried on the second PBCH includes third information and fourth information, the third information indicates that RMSI exists, and the fourth information indicates a resource set carrying control information for receiving the RMSI.

With reference to the second aspect, in some possible implementations of the second aspect, the resource information of the second synchronization signal block is frequency-domain resource position information of the second synchronization signal block or offset information of a frequency domain position of the second synchronization signal block relative to that of the first synchronization signal block.

With reference to the second aspect, in some possible implementations of the second aspect, a first bit field for carrying the second information and a second bit field for carrying the fourth information at least partially overlap.

With reference to the second aspect, in some possible implementations of the second aspect, the RMSI includes at least one of the following: a paging configuration parameter, cell selection information, and access control information.

According to a third aspect, an information transmission device is provided. The device is configured to perform the method according to the first aspect or any possible implementation of the first aspect. Specifically, the device includes a unit configured to perform the method according to the first aspect or any possible implementation of the first aspect.

According to a fourth aspect, an information transmission device is provided. The device includes a memory, a processor, an input interface, and an output interface. The memory, the processor, the input interface, and the output interface are connected based on a bus system. The memory is configured to store instructions. The processor is configured to execute the instructions stored in the memory, and configured to perform the method according to the first aspect or any possible implementation of the first aspect.

According to a fifth aspect, an information transmission device is provided. The device is configured to perform the method according to the second aspect or any possible implementation of the second aspect. Specifically, the device includes a unit configured to perform the method according to the second aspect or any possible implementation of the second aspect.

According to a sixth aspect, an information transmission device is provided. The device includes a memory, a processor, an input interface, and an output interface. The memory, the processor, the input interface, and the output interface are connected based on a bus system. The memory is configured to store instructions. The processor is configured to execute the instructions stored in the memory, and configured to perform the method according to the second aspect or any possible implementation of the second aspect.

According to a seventh aspect, a computer storage medium is provided, and is configured to store computer software instructions used for performing the method according to the first aspect or any possible implementation of the first aspect. The computer software instructions include a program designed for performing the foregoing aspect.

According to an eighth aspect, a computer program product including instructions is provided. When the computer program product is run on a computer, the computer is enabled to perform the method according to the first aspect or any possible implementation of the first aspect.

According to a ninth aspect, a computer storage medium is provided, and is configured to store computer software instructions used for performing the method according to the second aspect or any possible implementation of the second aspect. The computer software instructions include a program designed for performing the foregoing aspect.

According to a tenth aspect, a computer program product including instructions is provided. When the computer program product is run on a computer, the computer is enabled to perform the method according to the second aspect or any possible implementation of the second aspect.

DETAILED DESCRIPTION OF THE INVENTION

The following describes technical solutions of embodiments of this application with reference to accompanying drawings.

The technical solutions in the embodiments of this application may be applied to various communications systems, such as a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, LTE time division duplex (TDD), Universal Mobile Telecommunications System (UMTS), a Worldwide Interoperability for Microwave Access (WiMAX) communications system, or a future 5G system.

Figure 1:
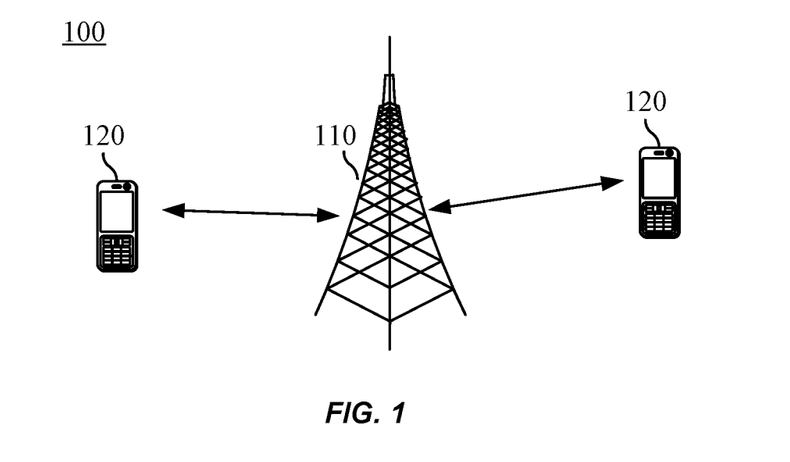
FIG. 1 is a schematic diagram of an application scenario according to an embodiment of this application.

FIG. 1 shows a wireless communications system 100 to which the embodiments of this application are applied. The wireless communications system 100 may include a network device 110. The network device 110 may be a device that can communicate with a terminal device. The network device 110 may provide communication coverage for a specific geographical region, and may communicate with a terminal device (for example, UE) located within the coverage area. Optionally, the network device 110 may be a base transceiver station (BTS) in a GSM system or CDMA system, a NodeB (NB) in a WCDMA system, an evolved NodeB (eNB or eNodeB) in an LTE system, or a wireless controller in a cloud radio access network (CRAN), or the network device may be a relay station, an access point, an in-vehicle device, a wearable device, a network side device in a future 5G network, a network device in an evolved public land mobile network (PLMN), or the like.

The wireless communications system 100 further includes at least one terminal device 120 located within a coverage range of the network device 110. The terminal device 120 may be mobile or fixed. Optionally, the terminal device 120 may be an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, a terminal device in a future evolved PLMN, or the like.

It should be noted that in a 5G NR system, a PBCH may also be referred to as an NR-PBCH, a PDCCH may also be referred to as an NR-PDCCH, and a PDSCH may also be referred to as an NR-PDSCH. That is, in the 5G NR system, the foregoing concepts may be used exchangeably.

In the 5G NR system, a public channel (for example, a broadcast channel) and a synchronization signal may cover an entire cell through multi-beam scanning, so that a terminal device in the cell performs receiving. Multi-beam sending of a synchronization signal may be implemented based on a synchronization signal burst set (SS burst set). For example, one SS burst set may include one or more SS bursts, one SS burst may include one or more SS blocks, and one SS block may be used to carry a synchronization signal and a broadcast channel of one beam. For example, one SS block includes a one-symbol primary synchronization signal (PSS), a one-symbol secondary synchronization signal (SSS), and a two-symbol PBCH.

Specifically, the PBCH may be used to carry CORESET information, where the CORESET information indicates a resource set carrying control information for receiving RMSI. That is, resources on which a control channel is detected or on which control information is obtained may be learned of based on the CORESET information. For example, the CORESET information may include the following information: a frequency domain resource, a starting orthogonal frequency division multiplexing (OFDM) symbol, a time length, and the like.

The PBCH may be further used to carry indication information, where the indication information may be used to indicate whether the SS block is associated with sending of RMSI, or, the indication information may be used to indicate whether RMSI exists. The indication information may be 1-bit indication information. When no RMSI exists, because the terminal device does not obtain RMSI in this case, the terminal device does not know resource information of other SS blocks. Therefore, the terminal device needs to blindly detect other SS blocks to obtain RMSI, to access a network. This increases power consumption and an access delay of the terminal device.

Specifically, the RMSI may be carried on the PDSCH. The terminal device may receive DCI carried in the PDCCH, obtain scheduling information of the PDSCH according to the DCI, and receive the PDSCH based on the scheduling information of the PDSCH, to obtain the RMSI. Information about a resource set carrying the PDCCH may be indicated based on the CORESET information carried in the PBCH. After obtaining the CORESET information, the terminal device may detect the PDCCH in the resource set indicated by the CORESET downlink, to obtain the DCI.

Figure 2:
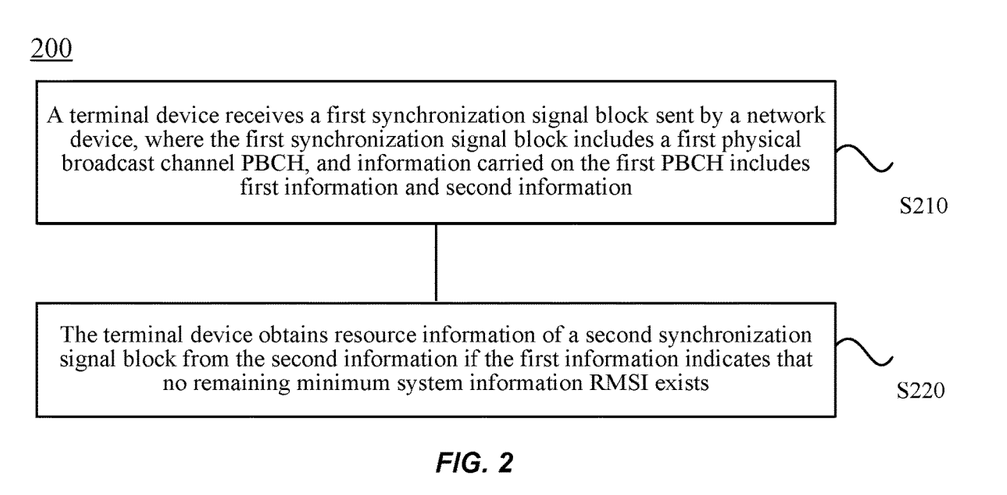
FIG. 2 is a schematic flowchart of an information transmission method according to an embodiment of this application.

FIG. 2 is a schematic flowchart of an information transmission method 200 according to an embodiment of this application. The method 200 may be performed by the terminal device in the communications system 100 shown in FIG. 1. As shown in FIG. 2, the method 200 may include the following content:

S210. The terminal device receives a first synchronization signal block sent by a network device, where the first synchronization signal block includes a first physical broadcast channel PBCH, and information carried on the first PBCH includes first information and second information.

S220. The terminal device obtains resource information of a second synchronization signal block from the second information if the first information indicates that no remaining minimum system information RMSI exists.

Specifically, the terminal device may receive the first synchronization signal block, where the first synchronization signal block may include the first PBCH. Optionally, the first synchronization signal block may further include a PSS, an SSS, and the like. The information carried on the first PBCH may include the first information and the second information, and the first information may be used to indicate whether RMSI exists. Optionally, if the first information is used to indicate that no RMSI exists, the second information may be used to indicate the resource information of the second synchronization signal block. Alternatively, if the first information is used to indicate that RMSI exists, the second information may be used to indicate a resource set carrying control information for receiving the RMSI.

In this embodiment of this application, of the first information indicates that no RMSI exists, the terminal device may obtain the resource information of the second synchronization signal block from the second information carried on the PBCH, and then may receive the second synchronization signal block according to the resource information of the second synchronization signal block.

Therefore, in the information transmission method in this embodiment of this application, the terminal device may obtain the resource information of the second synchronization signal block based on the second information carried on the first PBCH when the first information carried on the first PBCH indicates that no RMSI exists, and further may receive the second synchronization signal block according to the resource information of the second synchronization signal block, thereby reducing complexity of blindly detecting other synchronization signal blocks by the terminal device. This helps reduce power consumption and an access delay of the terminal device.

Optionally, in some embodiments, the method 200 may further include: receiving, by the terminal device, the second synchronization signal block according to the resource information of the second synchronization signal block, where the second synchronization signal block includes a second physical broadcast channel PBCH, information carried on the second PBCH includes third information and fourth information, the third information indicates that RMSI exists, and the fourth information indicates a resource set carrying control information for receiving the RMSI.

Specifically, after learning of the resource information of the second synchronization signal block according to the second information, the terminal device may receive the second synchronization signal block on a resource location indicated by the resource information of the second synchronization signal block, and obtain the carried third information and fourth information from the second PBCH included in the second synchronization signal block, and further, in case that the third information indicates that RMSI exists, may obtain the RMSI according to the fourth information.

Optionally, in some embodiments, the obtaining, by the terminal device, the RMSI according to the fourth information includes: detecting a physical downlink control channel PDCCH according to the resource set indicated by the fourth information, and obtaining scheduling information of a physical downlink shared channel PDSCH; and obtaining, according to the scheduling information of the PDSCH, RMSI carried on the PDSCH.

Specifically, in case that the third information indicates that the RMSI exists, the fourth information may indicate the resource set carrying the control information for receiving the RMSI. That is, according to the fourth information, the resource set carrying the control information related to the RMSI may be obtained. That is, the PDCCH may be detected on the resource set indicated by the fourth information, to obtain the scheduling information of the PDSCH carrying the RMSI. Further, the PDSCH may be detected according to the scheduling information of the PDSCH, to obtain the RMSI carried on the PDSCH. Then, a network may be accessed according to system information such as the RMSI.

Therefore, in the information transmission method in this embodiment of this application, the terminal device may obtain the resource information of the second synchronization signal block based on the second information carried on the first PBCH, and then may receive the second synchronization signal block according to the resource information of the second synchronization signal block, to obtain the third information and the fourth information included in the second PBCH, where the third information is used to indicate that the RMSI exists, and the fourth information indicates the resource set carrying the control information for receiving the RMSI. In this way, the terminal device may obtain the RMSI according to the fourth information, thereby reducing complexity of blindly detecting other synchronization signal blocks by the terminal device, and further reducing power consumption and an access delay of the terminal device.

It should be noted that the terminal device may further obtain resource information of more synchronization signal blocks from the second information, for example, may obtain resource information of a third synchronization signal block and a fourth synchronization signal block from the second information. This embodiment of this application is described only based on an example in which the resource information of the second synchronization signal block is obtained from the second information, and this embodiment of this application is not limited thereto.

It should be understood that, in this embodiment of this application, the first information may be used to indicate whether the RMSI exists, or the first information may be used to indicate whether the first synchronization signal block is associated with sending of the RMSI. Similarly, the third information may also be used to indicate whether the RMSI exists, or the third information may be used to indicate whether the second synchronization signal block is associated with sending of the RMSI. Optionally, bit fields for carrying the first information and the third information may be a same bit field. In a specific embodiment, the first information and the third information may correspond to the foregoing 1-bit indication information.

Optionally, in some embodiments, a first bit field for carrying the second information and a second bit field for carrying the fourth information at least partially overlap.

It should be understood that, this embodiment of this application does not particularly limit sizes of the first bit field and the second bit field, for example, the first bit field may be greater than the second bit field, or the second bit field may be greater than the first bit field, or the first bit field may be equal to the second bit field, provided that the first bit field and the second bit field at least partially overlap.

That is, when indication information carried on a PBCH indicates that RMSI exists, a second bit field in the PBCH may be used to carry a resource set of control information for receiving the RMSI. When the indication information carried on the PBCH indicates that no RMSI exists, the fourth information actually makes no sense. Therefore, the fourth information may not need to be carried still based on the second bit field. Instead, a part or all of the second bit field may be used to carry the second information. In other words, in different scenarios, a specific bit field (namely, an overlapping part of the first bit field and the second bit field) in the PBCH may be reused to carry different information, thereby reducing signaling overheads.

For example, if the first bit field for carrying the second information is eight bits, the second bit field for carrying the fourth information is ten bits, and start positions of the first bit field and the second bit field are the same, the first bit field and the second bit field have an overlapping area of eight bits. In case that the third information indicates that the RMSI exists, the second bit field may be used to carry the resource set of the control information for receiving the RMSI. When the first information indicates that no RMSI exists, the fourth information actually makes no sense. Therefore, the fourth information may not need to be carried still based on the second bit field. Instead, in this case, resource information of another synchronization signal block may be carried based on the first bit field, thereby reducing signaling overheads.

Preferably, a same bit field may be reused for the first bit field and the second bit field. That is, the first bit field and the second bit field completely overlap.

Optionally, in some embodiments, the second bit field for carrying the fourth information may be an existing CORESET indication field, where the CORESET indication field may be used to carry CORESET information. That is, the terminal device may learn of, according to the CORESET information, resources on which a control channel is detected. In this case, the first bit field for carrying the second information may include a part or all of the CORESET indication field.

To be specific, a part or all of the CORESET indication field carried on the PBCH may be used to carry the second information. For example, when the first information carried on the first PBCH indicates that no RMSI exists, CORESET information carried in a CORESET indication field of the first PBCH actually makes no sense, in other words, there is no need to fill CORESET information in the CORESET indication field. In this case, the resource information of the second synchronization signal block may be filled in a part or all of the CORESET indication field. In this way, the terminal device may detect the second synchronization signal block according to the resource information of the second synchronization signal block that is filled in the CORESET indication field, thereby reducing complexity of detecting another SS block by the terminal device. In addition, resource information of another synchronization signal block is carried in the existing CORESET indication field, thereby being better compatible with the prior art, and helping reduce signaling overheads.

Optionally, in this embodiment of this application, the resource information of the second synchronization signal block may include information about a time domain resource and/or information about a frequency domain resource of the second synchronization signal block.

For example, the information about the frequency domain resource of the second synchronization signal block may be frequency-domain resource position information of the second synchronization signal block or may be offset information of a frequency domain position of the second synchronization signal block relative to that of the first synchronization signal block.

Optionally, in some embodiments, the RMSI includes at least one of the following: a paging configuration parameter, cell selection information, and access control information.

That is, the RMSI may be used by the terminal device to access a network.

Figure 3:
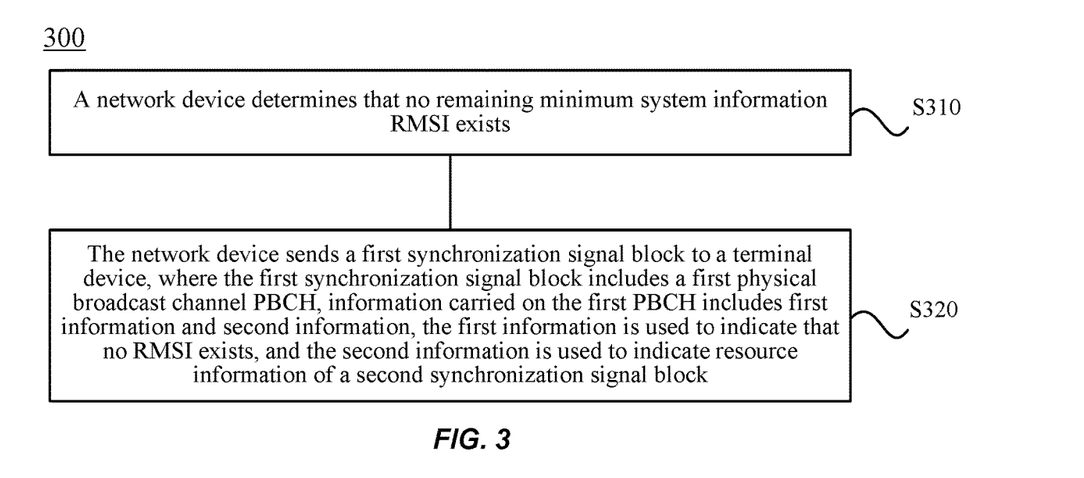
FIG. 3 is a schematic flowchart of an information transmission method according to another embodiment of this application.

The information transmission method according to this embodiment of this application is described from the perspective of the terminal device with reference to FIG. 2, and an information transmission method according to an embodiment of this application is described from the perspective of a network device with reference to FIG. 3. It should be understood that, descriptions on a side of the network device correspond to descriptions on a side of the terminal device. For similar descriptions, refer to the foregoing descriptions. To avoid repetition, details are not described herein again.

FIG. 3 is a schematic flowchart of an information transmission method 300 according to another embodiment of this application. The method 300 may be performed by the network device in the communications system shown in FIG. 1. As shown in FIG. 3, the method 300 may include the following content:

S310. A network device determines that no remaining minimum system information RMSI exists.

S320. The network device sends a first synchronization signal block to a terminal device, where the first synchronization signal block includes a first physical broadcast channel PBCH, information carried on the first PBCH includes first information and second information, the first information is used to indicate that no RMSI exists, and the second information is used to indicate resource information of a second synchronization signal block.

Optionally, in some embodiments, the second synchronization signal block includes a second physical broadcast channel PBCH, information carried on the second PBCH includes third information and fourth information, the third information indicates that RMSI exists, and the fourth information indicates a resource set carrying control information for receiving the RMSI.

Optionally, in some embodiments, the resource information of the second synchronization signal block is frequency-domain resource position information of the second synchronization signal block or offset information of a frequency domain position of the second synchronization signal block relative to that of the first synchronization signal block.

Optionally, in some embodiments, a first bit field for carrying the second information and a second bit field for carrying the fourth information at least partially overlap.

Optionally, in some embodiments, the RMSI includes at least one of the following: a paging configuration parameter, cell selection information, and access control information.

The method embodiments in this application are described above in detail with reference to FIG. 2 and FIG. 3, apparatus embodiments in this application are described below in detail with reference to FIG. 4 to FIG. 7. It should be understood that, the apparatus embodiments correspond to the method embodiments. For similar descriptions, refer to the method embodiments.

Figure 4:
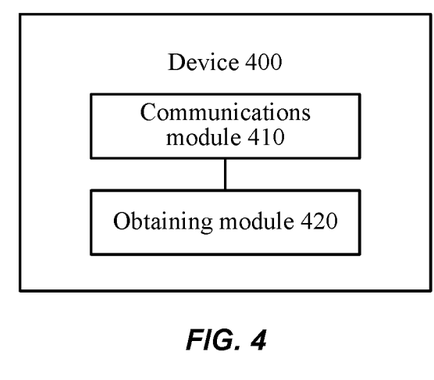
FIG. 4 is a schematic block diagram of an information transmission device according to an embodiment of this application.

FIG. 4 is a schematic block diagram of an information transmission device according to an embodiment of this application. The device 400 in FIG. 4 includes: a communications module 410, configured to receive a first synchronization signal block sent by a network device, where the first synchronization signal block includes a first physical broadcast channel PBCH, and information carried on the first PBCH includes first information and second information; and an obtaining module 420, configured to obtain resource information of a second synchronization signal block from the second information in case that the first information indicates that no remaining minimum system information RMSI exists.

Optionally, in some embodiments, the communications module 410 may be further configured to: receive the second synchronization signal block according to the resource information of the second synchronization signal block, where the second synchronization signal block includes a second physical broadcast channel PBCH, information carried on the second PBCH includes third information and fourth information, the third information indicates that RMSI exists, and the fourth information indicates a resource set carrying control information for receiving the RMSI.

Optionally, in some embodiments, the obtaining module 420 may be further configured to: in case that the third information indicates that RMSI exists, obtain the RMSI according to the fourth information.

Optionally, in some embodiments, the obtaining module 420 may be specifically configured to: detect a physical downlink control channel PDCCH according to the resource set indicated by the fourth information, and obtain scheduling information of a physical downlink shared channel PDSCH; and obtain, according to the scheduling information of the PDSCH, RMSI carried on the PDSCH.

Optionally, in some embodiments, the resource information of the second synchronization signal block is frequency-domain resource position information of the second synchronization signal block or offset information of a frequency domain position of the second synchronization signal block relative to that of the first synchronization signal block.

Optionally, in some embodiments, a first bit field for carrying the second information and a second bit field for carrying the fourth information at least partially overlap.

Optionally, in some embodiments, the RMSI includes at least one of the following: a paging configuration parameter, cell selection information, and access control information.

Specifically, the device 400 may correspond to (for example, may be configured as or may itself be) the terminal device described in the method 200. In addition, various modules or units of the device 400 are separately configured to perform various actions or processing processes performed by the terminal device in the method 200. Herein, to avoid repetition, detailed descriptions are omitted.

Figure 5:
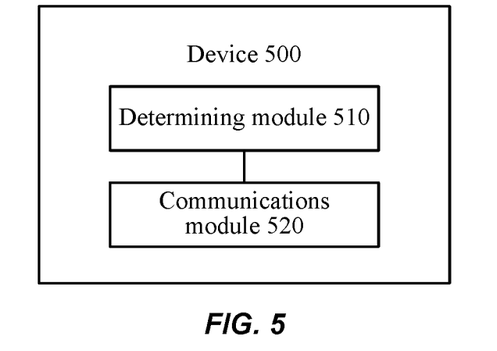
FIG. 5 is a schematic block diagram of an information transmission device according to another embodiment of this application.

FIG. 5 is a schematic block diagram of an information transmission device according to an embodiment of this application. The device 500 in FIG. 5 includes: a determining module 510, configured to determine that no remaining minimum system information RMSI exists; and a communications module 520, configured to send a first synchronization signal block to a terminal device, where the first synchronization signal block includes a first physical broadcast channel PBCH, information carried on the first PBCH includes first information and second information, the first information is used to indicate that no RMSI exists, and the second information is used to indicate resource information of a second synchronization signal block.

Optionally, in some embodiments, the second synchronization signal block includes a second physical broadcast channel PBCH, information carried on the second PBCH includes third information and fourth information, the third information indicates that RMSI exists, and the fourth information indicates a resource set carrying control information for receiving the RMSI.

Optionally, in some embodiments, the resource information of the second synchronization signal block is frequency-domain resource position information of the second synchronization signal block or offset information of a frequency domain position of the second synchronization signal block relative to that of the first synchronization signal block.

Optionally, in some embodiments, a first bit field for carrying the second information and a second bit field for carrying the fourth information at least partially overlap.

Optionally, in some embodiments, the RMSI includes at least one of the following: a paging configuration parameter, cell selection information, and access control information.

Specifically, the device 500 may correspond to (for example, may be configured as or may itself be) the network device described in the method 300. In addition, various modules or units of the device 500 are separately configured to perform various actions or processing processes performed by the network device in the method 300. Herein, to avoid repetition, detailed descriptions are omitted.

Figure 6:
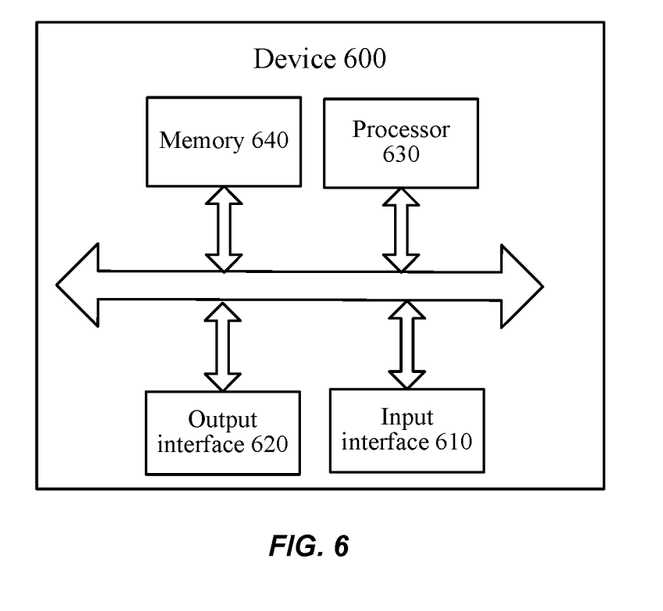
FIG. 6 is a schematic block diagram of an information transmission device according to an embodiment of this application.

As shown in FIG. 6, an embodiment of this application further provides an information transmission device 600. The device 600 may be the device 400 in FIG. 4, and can be configured to execute content of the terminal device corresponding to the method 200 in FIG. 2. The device 600 includes an input interface 610, an output interface 620, a processor 630, and a memory 640. The input interface 610, the output interface 620, the processor 630, and the memory 640 may be connected based on a bus system. The memory 640 is configured to store a program, an instruction, or code. The processor 630 is configured to execute the program, the instruction, or the code in the memory 640 to: control the input interface 610 to receive a signal, control the output interface 620 to send a signal, and complete operations in the foregoing method embodiment.

It should be understood that in this embodiment of this application, the processor 630 may be a central processing unit (CPU), or the processor 630 may be another general-purpose processor, a digital signal processor (DSP), an application-specific integrated circuit (ASIC), a field-programmable gate array (FPGA), another programmable logic device, a discrete gate or a transistor logic device, a discrete hardware component, or the like. The general-purpose processor may be a microprocessor, or the processor may be any conventional processor or the like.

The memory 640 may include a read-only memory and a random access memory, and provide an instruction and data to the processor 630. A part of the memory 640 may further include a non-volatile random access memory. For example, the memory 640 may further store information about a device type.

In an implementation process, content in the foregoing method may be completed based on an integrated logical circuit of hardware in the processor 630 or instructions in a form of software in the processor 630. The content of the methods disclosed with reference to the embodiments of this application may be directly performed and completed by a hardware processor, or may be performed and completed based on a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 640, and the processor 630 reads information in the memory 640 and completes the content in the foregoing method in combination with hardware of the processor. To avoid repetition, details are not described herein again.

In a specific implementation, the obtaining module 420 included in the device 400 in FIG. 4 may be implemented by the processor 630 in FIG. 6, and the communications module 410 included in the device 400 in FIG. 4 may be implemented by the input interface 610 and the output interface 620 in FIG. 6.

Figure 7:
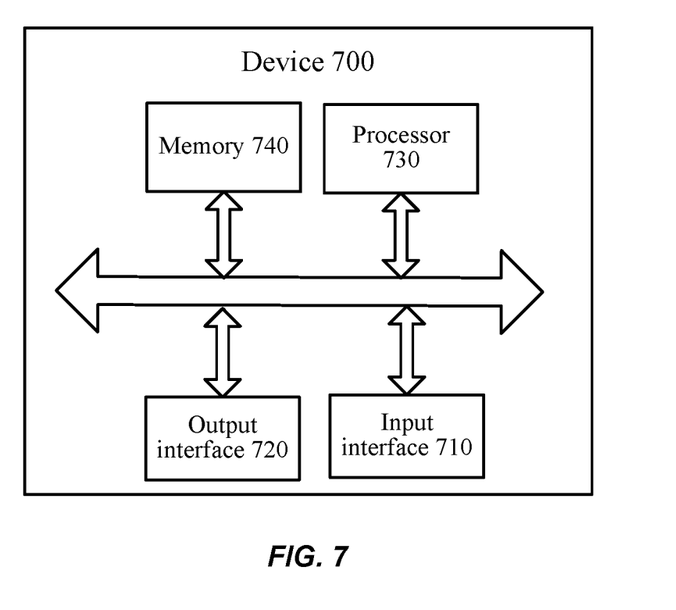
FIG. 7 is a schematic block diagram of an information transmission device according to another embodiment of this application.

As shown in FIG. 7, an embodiment of this application further provides an information transmission device 700. The device 700 may be the device 500 in FIG. 5, and can be configured to execute content of the network device corresponding to the method 300 in FIG. 3. The device 700 includes an input interface 710, an output interface 720, a processor 730, and a memory 740. The input interface 710, the output interface 720, the processor 730, and the memory 740 may be connected based on a bus system. The memory 740 is configured to store a program, an instruction, or code. The processor 730 is configured to execute the program, the instruction, or the code in the memory 740 to: control the input interface 710 to receive a signal, control the output interface 720 to send a signal, and complete operations in the foregoing method embodiment.

It should be understood that in this embodiment of this application, the processor 730 may be a central processing unit (CPU), or the processor 730 may be another general-purpose processor, a digital signal processor (DSP), an application-specific integrated circuit (ASIC), a field-programmable gate array (FPGA), another programmable logic device, a discrete gate or a transistor logic device, a discrete hardware component, or the like. The general-purpose processor may be a microprocessor, or the processor may be any conventional processor or the like.

The memory 740 may include a read-only memory and a random access memory, and provide an instruction and data to the processor 730. A part of the memory 740 may further include a non-volatile random access memory. For example, the memory 740 may further store information about a device type.

In an implementation process, content in the foregoing method may be completed based on an integrated logical circuit of hardware in the processor 730 or instructions in a form of software in the processor 730. The content of the methods disclosed with reference to the embodiments of this application may be directly performed and completed by a hardware processor, or may be performed and completed based on a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 740, and the processor 730 reads information in the memory 740 and completes the content in the foregoing method in combination with hardware of the processor. To avoid repetition, details are not described herein again.

In a specific implementation, the determining module 510 included in the device 500 in FIG. 5 may be implemented by the processor 730 in FIG. 7, and the communications module 520 included in the device 500 in FIG. 5 may be implemented by the input interface 710 and the output interface 720 in FIG. 7.

An embodiment of this application further proposes a computer-readable storage medium. The computer-readable storage medium stores one or more programs. The one or more programs include instructions. The instructions, when being executed by a portable electronic device including a plurality of application programs, can enable the portable electronic device to perform the methods in the embodiments shown in FIG. 2 and FIG. 3.

An embodiment of this application further proposes a computer program. The computer program includes instructions. When executed by a computer, the computer program enables the computer to perform a corresponding procedure in the methods in the embodiments shown in FIG. 2 and FIG. 3.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment, and details are not described herein again.

In the several embodiments provided in this application, it should be understood that the disclosed system, apparatus, and method may be implemented in other manners. For example, the described apparatus embodiments are merely examples. For example, the unit division is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented based on some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for transmitting information, the method comprising:

receiving, by a terminal device, a first synchronization signal block sent by a network device, wherein the first synchronization signal block comprises a first physical broadcast channel (PBCH), and wherein information carried on the first PBCH comprises first information and second information;

wherein the first information is used for indicating whether remaining minimum system information (RMSI) is present, and when the first information indicates that RMSI is not present, the second information is used for indicating resource information of a second synchronization signal block;

obtaining, by the terminal device, resource information of the second synchronization signal block based on the second information if the first information indicates that remaining minimum system information RMSI is not present; and receiving, by the terminal device, the second synchronization signal block, wherein the second synchronization signal block comprises a second PBCH, information carried on the second PBCH comprises third information and fourth information;

wherein the third information is used for indicating whether RMSI is present, and when the third information indicates that RMSI is present, the fourth information is used for indicating a resource set carrying control information for receiving RMSI.

2. The method of claim 1, wherein the second synchronization signal block is received according to the resource information of the second synchronization signal block.

3. The method of claim 1, wherein the first PBCH comprises a first field, the first field is used for carrying the second information; and,
wherein the second PBCH comprises a second field, the second field is identical to the first field, and the second field is used for carrying the fourth information.

4. The method of claim 1, wherein a field in the first PBCH used for carrying the first information is identical to as the field in the second PBCH used for carrying the third information.

5. The method of claim 4, wherein the method further comprises:
if the third information indicates that RMSI is present, obtaining, by the terminal device, RMSI according to the fourth information.

6. The method of claim 5, wherein obtaining, by the terminal device, RMSI according to the fourth information comprises:
obtaining scheduling information of a physical downlink shared channel (PDSCH), by monitoring a physical downlink control channel PDCCH according to the resource set indicated by the fourth information; and
obtaining, according to the scheduling information of the PDSCH, RMSI carried on the PDSCH.

7. The method of claim 1, wherein the resource information of the second synchronization signal block is frequency resource location information of the second synchronization signal block or frequency location offset information between the second synchronization signal block and the first synchronization signal block.

8. The method of claim 1, wherein the RMSI comprises at least one of the following:
a paging configuration parameter, cell selection information, or access control information.

9. A method of transmitting information, the method comprising:
determining, by a network device, that no remaining minimum system information (RMSI) is present; and
sending, by the network device, a first synchronization signal block to a terminal device, wherein the first synchronization signal block comprises a first physical broadcast channel (PBCH), and information carried on the first PBCH comprises first information and second information;
wherein the first information is used for indicating that RMSI is not present, the second information is used for indicating resource information of a second synchronization signal block, the second synchronization signal block comprises a second PBCH, information carried on the second PBCH comprises third information and fourth information, the third information indicates that RMSI is present, and the fourth information indicates a resource set carrying control information for receiving the RMSI.

10. The method of claim 9, wherein the first PBCH comprises a first field used for carrying the second information
the second PBCH comprises a second field, the second field is identical to as the first field, and the second field is used for carrying the fourth information.

11. The method of claim 9, wherein the resource information of the second synchronization signal block is frequency resource location information of the second synchronization signal block or frequency location offset information between the second synchronization signal block and the first synchronization signal block.

12. The method of claim 9, wherein the RMSI comprises at least one of:
a paging configuration parameter, cell selection information, or access control information.

13. An information transmission device comprising:
a memory configured to store computer-executable instructions;
one or more processors in communication with the memory and configured to execute the computer-executable instructions; and
a communications interface configured to receive a first synchronization signal block sent by a network device, wherein the first synchronization signal block comprises a first physical broadcast channel (PBCH), and information carried on the first PBCH comprises first information and second information;
wherein the one or more processors is configured to indicate, using the first information, whether remaining minimum system information (RMSI) is present, and when the first information indicates that RMSI is not present, the one or more processors is configured to indicate, using the second information, resource information of a second synchronization signal block, and
wherein the communications interface is further configured to receive the second synchronization signal block according to the resource information of the second synchronization signal block, wherein the second synchronization signal block comprises a second PBCH, information carried on the second PBCH comprises third information and fourth information, the third information indicates that RMSI exists, and the fourth information indicates a resource set carrying control information for receiving the RMSI.

14. The information transmission device of claim 13, wherein the communications interface is configured to:
obtain resource information of the second synchronization signal block based on the second information if the first information indicates that RMSI is not present.

15. The information transmission device of claim 13, wherein the first PBCH comprises a first field, the first field is used for carrying the second information and
wherein a second PBCH comprises a second field, the second field is identical to as the first field, and the second field is used for carrying fourth information.

16. The information transmission device of claim 13, wherein a first field in the first PBCH used for carrying the first information is identical to as a second field in the second PBCH used for carrying third information.

17. The information transmission device of claim 13, wherein a first bit field for carrying the second information and a second bit field for carrying the fourth information at least partially overlap.

18. The information transmission device of claim 13, wherein, in case that the third information indicates that RMSI exists, the communications interface is further configured to obtain the RMSI according to the fourth information.

19. The information transmission device of claim 18, wherein the communications interface is specifically configured to:
detect a physical downlink control channel (PDCCH) according to the resource set indicated by the fourth information, and obtain scheduling information of a physical downlink shared channel (PDSCH); and obtain, according to the scheduling information of the PDSCH, RMSI carried on the PDSCH.

20. The information transmission device of claim 13, wherein the resource information of the second synchronization signal block is frequency-domain resource position information of the second synchronization signal block or offset information of a frequency domain position of the second synchronization signal block relative to that of the first synchronization signal block.

21. The information transmission device of claim 13, wherein the RMSI comprises at least one of the following:
   a paging configuration parameter, cell selection information, or access control information.

22. An information transmission device comprising:
   a memory configured to store computer-executable instructions;
   one or more processors in communication with the memory and configured to execute the computer-executable instructions to at least determine that no remaining minimum system information (RMSI) exists; and
   a communications interface configured to send a first synchronization signal block to a terminal device, wherein the first synchronization signal block comprises a first physical broadcast channel (PBCH), information carried on the first PBCH comprises first information and second information, the first information is used to indicate that no RMSI exists, and the second information is used to indicate resource information of a second synchronization signal block, wherein the second synchronization signal block comprises a second physical broadcast channel PBCH, information carried on the second PBCH comprises third information and fourth information, the third information indicates that RMSI exists, and the fourth information indicates a resource set carrying control information for receiving the RMSI.

23. The information transmission device of claim 22, wherein a first bit field for carrying the second information and a second bit field for carrying the fourth information at least partially overlap.

24. The information transmission device of claim 22, wherein the resource information of the second synchronization signal block is frequency-domain resource position information of the second synchronization signal block or offset information of a frequency domain position of the second synchronization signal block relative to that of the first synchronization signal block.

25. The information transmission device of claim 22, wherein the RMSI comprises at least one of the following:
   a paging configuration parameter, cell selection information, or access control information.

* * * * *